United States Patent [19]

Mishima et al.

[11] Patent Number: 5,290,876
[45] Date of Patent: Mar. 1, 1994

[54] LOW GLOSS AGENTS, PROCESS FOR PRODUCTION THEREOF, LOW GLOSS THERMOPLASTIC RESIN COMPOSITIONS, AND MOLDED ARTICLES

[75] Inventors: Seizou Mishima; Kiyotaka Mashita, both of Ichihara; Kazuyoshi Shike, Hitachi; Jun Matsuzawa, Tsukuba; Masashi Shitara, Chiba; Isamu Hattori, Ichihara, all of Japan

[73] Assignee: Hitachi Chemical Company, Ltd., Tokyo, Japan

[21] Appl. No.: 7,779

[22] Filed: Jan. 22, 1993

Related U.S. Application Data

[62] Division of Ser. No. 775,849, Oct. 15, 1991, which is a division of Ser. No. 468,000, Jan. 22, 1990, Pat. No. 5,081,193.

[30] Foreign Application Priority Data

| | | | |
|---|---|---|---|
| Jan. 23, 1989 | [JP] | Japan | 1-013368 |
| May 18, 1989 | [JP] | Japan | 1-124975 |
| Jul. 3, 1989 | [JP] | Japan | 1-171624 |
| Jul. 3, 1989 | [JP] | Japan | 1-171626 |
| Oct. 24, 1989 | [JP] | Japan | 1-276281 |

[51] Int. Cl.$^5$ .................. C08F 279/04; C08L 51/04
[52] U.S. Cl. .................. 525/316; 525/73; 525/80; 525/87
[58] Field of Search .................. 525/316, 73, 80, 87

[56] References Cited

U.S. PATENT DOCUMENTS

| | | | |
|---|---|---|---|
| 4,183,877 | 1/1980 | Ibaragi et al. | 525/70 |
| 4,937,280 | 6/1990 | Biglione | 525/67 |
| 5,082,891 | 1/1992 | Morita et al. | 525/446 |
| 5,180,786 | 1/1993 | Era et al. | 525/316 |

Primary Examiner—Vasu S. Jagannathan
Attorney, Agent, or Firm—Antonelli, Terry, Stout & Kraus

[57] ABSTRACT

A grafted copolymer containing low cis-polybutadiene having a Mooney viscosity of 30 to 40 as a rubber component, and 30% by volume or more of particles of said rubber component becoming non-spherical rubber particles when molded into a molded article, is suitable for use as a low gloss agent which is usable in the fields of internal and external automotive trims, exterior parts of household electric appliances, etc.

7 Claims, 4 Drawing Sheets

10 μm

DIRECTION OF FLOW

10μm

DIRECTION OF FLOW

10 μm 5,290,876

LOW GLOSS AGENTS, PROCESS FOR PRODUCTION THEREOF, LOW GLOSS THERMOPLASTIC RESIN COMPOSITIONS, AND MOLDED ARTICLES

This application is a divisional application of application Ser. No. 775,849, filed Oct. 15, 1991, which is a divisional application of application Ser. No. 468,000, filed Jan. 22, 1990 (now U.S. Pat. No. 5,081,193).

BACKGROUND OF THE INVENTION

This invention relates to a process for producing a low gloss agent capable of giving molded articles having a low gloss, the low gloss agents, low gloss thermoplastic resin compositions and molded articles, which can be used in the fields of, for example, internal and external automotive trims, exterior parts of household electric appliances, office automation appliances and the like, and building materials such as gutter, in which not only high heat resistance and impact strength but also low gloss are required.

Thermoplastic resins are utilized for various purposes because of their excellent processability and mechanical properties. The surface of molded articles of these resins usually has a good gloss, but there is also a demand for molded articles having a low surface gloss.

Particularly when a molded article is used as an internal or external automotive trim, its gloss should be sufficiently low to avoid lowering of visibility by reflected light and secure safe driving.

As a method for imparting a low gloss to the surface of molded articles, there have heretofore been known, for example, (1) a method of embossing the surface of a mold, (2) a method of coating a low gloss coating material on the surface of a molded article, (3) a method of mixing a resin with an inorganic filler such as talc, calcium carbonate, mica, etc., (4) a method of mixing a thermoplastic resin with a crosslinked polymer, (5) a method of adding a rubber-like elastomer to a starting resin, and (6) a method of increasing the particle size of a rubber grafted in emulsion polymerization.

The above low gloss imparting methods have, for example, defects described below. In the case of the method of (1), no sufficient low gloss imparting effect can be obtained, and a molded article surface having a complicated shape cannot be embossed. In the case of the method of (2), a coating step costs much, environmental pollution is caused, and the resin surface and physical properties are deteriorated by a solvent. In the case of the methods of (3) and (4), lowering of the impact strength is unavoidable, and the gloss of molded article changes depending on molding conditions including molding pressure, mold temperature, etc., so that no uniform low gloss can be attained. In the case of the methods of (5) and (6), nonuniformity of gloss tends to be caused, weld lines are formed owing to the rubber-like elastomer, and the stiffness and hardness of molded article are deteriorated. Thus, according to the prior art, it has been very difficult to attain both high impact strength and low gloss.

Particularly in attaining an improved heat resistance which is required of internal automotive trims, it is more difficult to maintain the impact strength as in the case of ordinary thermoplastic resins.

SUMMARY OF THE INVENTION

This invention provides a low gloss agent capable of giving a molded article having low surface gloss, no gloss nonuniformity, high heat resistance and high impact resistance; a process for producing the low gloss agent; low gloss thermoplastic resin compositions and molded articles obtained therefrom.

This invention provides a low gloss agent comprising a grafted copolymer containing a low-cis polybutadiene having a Mooney viscosity of 30 to 40 as a rubber component, 30% by volume or more of particles of the rubber component becoming non-spherical rubber particles when the low gloss agent is made into a molded article; a process for producing the low gloss agent; a low gloss thermoplastic resin composition containing said low gloss agent; and a molded article obtained therefrom.

DESCRIPTION OF THE PREFERRED EMBODIMENTS

First, the low gloss agent and the process for producing the same of this invention are explained below.

The low gloss agent of this invention is a grafted copolymer containing a rubber component. As the rubber component, a low-cis polybutadiene having a Mooney viscosity of 30 to 40 is used. When the Mooney viscosity is more than 40, the rubber component is difficult to stir when dissolved in monomers, because of high viscosity, or it does not show a high solubility in monomers. When the Mooney viscosity is less than 30, only insufficient low gloss imparting effect can be obtained. Mooney viscosity refers to the viscosity of rubber measured by means of a Mooney plastometer.

When a high-cis polybutadiene, a styrene-butadiene block copolymer or the like is used as the rubber component, desired low gloss and falling weight impact strength cannot be attained. When a high-cis polybutadiene is used, the gloss is as low as that attained when a low-cis polybutadiene is used, but the falling weight impact strength is lowered. When a styrene-butadiene block copolymer is used, only insufficient low gloss imparting effect can be obtained. Such a low-cis polybutadiene is a well-known material and includes, for example, NiPol 1241ST (mfd. by NIPPON ZEON CO., LTD.).

Figure 1:
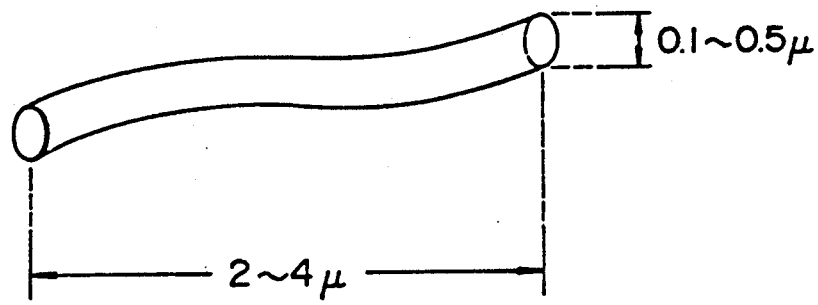
FIG. 1 is a perspective view showing one example of preferable shape of the rubber component containing in the low gloss agent of this invention after molding.

The low gloss agent of this invention is obtained by blending and polymerizing monomers as graft component in the presence of a rubber component (low-cis polybutadiene) having the above value of Mooney viscosity. For imparting a sufficiently low gloss, a high impact resistance, etc., it is necessary that when said low gloss agent is melt-kneaded and then molded, 30% by volume or more of particles of the rubber component dispersed in a matrix composed of components other than the rubber component should become non-spherical. In the present specification, the term "particles of the rubber component are non-spherical" means that the particles have a shape other than sphere, ellipses having a ratio of the major axis to the minor axis of 3 or less, or shapes similar to those shapes. The rubber component gives a sufficiently low gloss particularly when the proportion of particles dispersed in the shape of fibers (preferably, in the shape shown in FIG. 1). Therefore, it is preferable that the rubber component is dispersed in the shape of fibers near the surface layer of a molded article.

A method for confirming the shape of rubber particles is not critical. The shape of rubber particles can be judged, for example, by cutting a molded article shown in FIG. 2 into a ultra-thin slice (preferably in the vicinity of the surface layer of the molded article, particularly within 40 μm of the surface layer) in each of the directions of xy plane, yz plane and zx plane, staining the slice with $OsO_4$ ($OsO_4$ stained ultra thin cross section), and observing the stained slice by a transmission electron microscope (TEM).

When the proportion of non-spherical rubber particles is less than 30% by volume, no sufficiently low gloss can be attained, and the impact resistance is lowered.

A low gloss agent having the characteristics described above can be obtained by blending and bulk-suspension polymerization of monomer constituents in the Presence of a specific rubber component.

As the monomer constituents, aromatic vinyls and vinyl cyanides are preferably used from the viewpoint of moldability, impact resistance and chemical resistance. A typical example of the aromatic vinyls is styrene. As the aromatic vinyls, there can also be used α-methylstyrene, o-methylstyrene, p-methylstyrene, m-methylstyrene, p-ethylstyrene, 1,3-dimethylstyrene, vinylnaphthalene, etc. The vinyl cyanides includes acrylonitrile, methacrylonitrile, etc. The ratio of the aromatic vinyls to the vinyl cyanides is preferably 50/50 to 90/10 by weight, particularly preferably 60/40 to 80/20 by weight. When the proportion of the aromatic vinyls is too low, the moldability tends to be lowered. When it is too high, the impact resistance and the chemical resistance tend to be deteriorated because the proportion of the vinyl cyanides becomes low. If necessary, other vinyl monomers copolymerizable with these monomers can be used together with these monomers. The copolymerizable monomers include, for example, vinylcarboxylic acids such as acrylic acid, methacrylic acid, etc.; acrylic acid alkyl esters such as methyl acrylate, ethyl acrylate, etc.; methacrylic acid alkyl esters such as methyl methacrylate, ethyl methacrylate, butyl methacrylate, etc.; maleimide type monomers such as maleimide, N-methylmaleimide, N-ethylmaleimide, N-butylmaleimide, N-cyclohexylmaleimide, N-phenylmaleimide, etc.; and vinylcarboxylic acid amides such as acrylic amide, methacrylic amide, etc.

In producing the low gloss agent, the blending proportion of the low-cis polybutadiene is preferably in the range of 5 to 15% by weight (namely, the blending proportion of the monomer components is 95 to 85% by weight) based on the total weight of the low-cis polybutadiene and the monomer constituents, namely, the ratio between the rubber component and the graft component is preferably such that their proportions are in the above ranges. When the using amount of the low-cis polybutadiene is more than 15% by weight, the following troubles are caused in some cases: when the low-cis polybutadiene is dissolved in the monomers, the viscosity of the solution is high, so that uniform stirring becomes impossible, resulting in a long dissolution time and a low stability in bulk-suspension polymerization which leads to agglomeration and increase of the amount of polymer adhering to the inner wall of a polymerizer. When the using amount is less than 5% by weight, an insufficient low gloss imparting effect tends to be obtained.

The low gloss agent of this invention is produced by bulk-suspension polymerization, and the timing of switching bulk polymerization over to suspension polymerization is a very important control point for low gloss and impact resistance. That is, it is preferable to dissolve such a low-cis polybutadiene rubber in monomer constituents, subject the resulting solution to bulk polymerization, switch bulk polymerization over to suspension polymerization by adding water containing a suspension agent at the time when the polymerization conversion of the monomer constituents becomes 1 to 15%. In this case, when the polymerization conversion is less than 1%, no sufficiently low gloss can be attained. When it exceeds 15%, the surface becomes rough, or weld lines tend to be formed. The low gloss agent produced by the switching over to suspension polymerization at the time when the polymerization conversion is 1 to 15% has the highest impact strength.

The polymerization conversion can be determined by sampling a small amount of the reaction mixture from the polymerization system, weighing the sample, vaporizing its volatile matter by means of an infrared lamp, and measuring the remaining nonvolatile matter, followed by calculation. In the examples described hereinafter, the polymerization conversion was determined by this method.

A polymerization initiator used in the polymerization is not critical, and conventional free-radical initiators can be used. The polymerization initiator includes organic peroxides such as lauroyl peroxide, benzoyl peroxide, diethylene glycol bis(t-butylperoxycarbonate), diisopropyl peroxycarbonate, 1,1-di-t-butylperoxy-3,3,5-trimethylcyclohexane, t-butyl peroxybenzoate, t-butyl perlaurate, dicumyl peroxide, t-butylcumyl peroxide, di-t-butyl peroxide, etc. There can also be used azo compounds such as azobisisobutyronitrile, azobisisovaleronitrile, etc. These organic peroxides and azo compounds can optionally be used singly or as a mixture thereof. The polymerization initiator is used preferably in an amount of 0.01 to 10% by weight, particularly 0.1 to 1% by weight, based on the total weight of the monomers.

Although a temperature corresponding to the decomposition temperature of the polymerization initiator may be chosen as the polymerization temperature, the polymerization temperature is usually preferably 50° to 150° C. If necessary, there can be used suspension agents, antioxidants, molecular weight modifiers, lubricants, colorants, etc.

The suspension agents are used in the suspension polymerization. As the suspension agents, there can be used, for example, water-soluble polymeric compounds such as partially saponified polyvinyl alcohol, hydroxyethyl cellulose, sodium polyacrylate, methyl cellulose, poly(alkylene glycol), starch, gelatin, etc. Fine powders of inorganic compounds difficultly soluble in water, such as tribasic calcium phosphate, magnesium carbonate, calcium carbonate, etc. can also be used together with various surfactants. These polymeric compounds and inorganic compounds can optionally be used singly or as a mixture thereof. The suspension agents are preferable because they bring about a high suspension stability when used in an amount of 0.01 to 5% by weight, particularly 0.1 to 2% by weight, based on the total weight of aqueous medium.

Since acrylonitrile type monomers are water-soluble, they can be polymerized after adding a water-soluble inorganic salt and a water-soluble polymerization inhibitor in order to reduce the solubility of the monomers and prevent their polymerization in aqueous phase.

For attaining an especially high impact resistance, it is preferable to adjust the weight average molecular weight of acetone-soluble part of the low gloss agent of this invention to 100,000–600,000, particularly 150,000–600,000. The adjustment can be conducted by a conventional method by, if necessary, using a molecular weight modifier, etc. When the weight average molecular weight is less than 100,000, the Izod impact strength tends to be lowered. When it exceeds 600,000, the melting viscosity of resin tends to be increased, resulting in a low fluidity and a poor moldability.

The weight average molecular weight of acetone-soluble part is determined by dissolving 2 g of a sample in 100 ml of acetone with stirring for 24 hours, separating the soluble part from the insoluble part by means of a centrifuge, and measuring the soluble part by gel permeation chromatography, followed by conversion by use of a standard-polystyrene calibration curve.

A molecular weight modifier can optionally be used in the bulk-suspension polymerization in order to adjust the molecular weight of the low gloss agent. As the molecular weight modifier, there can be used, for example, mercaptans such as n-octyl mercaptan, n-dodecyl mercaptan, t-dodecylmercaptan, mercaptoethanol, etc.; various terpenes; and halogenated hydrocarbons such as chloroform, carbon tetrachloride, etc. These molecular weight modifiers need not necessarily be used. When they are used, their amount is preferably very small, for example, 0.4% by weight or less based on the weight of the monomer constituents.

The low gloss agent of this invention thus obtained can be molded as it is. It can also be contained as an essential constituent in the low gloss thermoplastic resin composition of this invention.

Next, said composition is explained below.

Although the content of the low gloss agent in said composition is not critical and is properly chosen depending on the kind of polymers to be mixed with the low gloss agent, a desired lowness of gloss (a desired gloss), etc., it is preferably 5% by weight or more for producing a low gloss imparting effect.

Polymer constituents other than the low gloss agent and mixed with the low gloss agent are not critical, and conventional various copolymers can be used.

There can be used, for example, generally known copolymers such as acrylonitrile-butadiene-styrene copolymer (ABS resin), methyl methacrylate-butadiene-styrene copolymer (MBS resin), acrylonitrile-ethylene propylene diene-styrene copolymer (AES resin), acrylonitrile-butyl acrylate-styrene copolymer (AAS resin), acrylonitrile-butyl acrylate-α-methylstyrene-styrene copolymer (heat-resistant AAS resin), acrylonitrile-butyl acrylate-α-methylstyrene-N-phenylmaleimide (super heat-resistant AAS resin), etc. These copolymers can be used singly or in combination of two or more thereof.

These copolymers are contained in the low gloss thermoplastic resin composition in an amount of preferably less than 95% by weight, more preferably 70 to 30% by weight, based on the weight of said composition. When the content is more than 70% by weight, the light reflectance (gloss) on the surface of molded article tends to be increased, so that the lowness of gloss is apt to become insufficient. When the content is less than 30% by weight, properties of the low gloss agent itself are excessively exhibited, resulting in a rough surface and easy formation of weld lines. A particularly preferable range of the content is 60 to 40% by weight.

The low gloss agent can be made into a thermoplastic resin composition more excellent in heat resistance by mixing with a polycarbonate.

The polycarbonate used in this invention is preferably one which has a number average molecular weight of approximately 8,000–200,000, in particular, 10,000–80,000, because such a polycarbonate has satisfactory heat resistance and impact strength. The number average molecular weight can be measured by gel permeation chromatography. A polycarbonate having an intrinsic viscosity of 0.4–1.0 dl/g as measured in methylene chloride at 25° C. is preferable. When the intrinsic viscosity is less than 0.4 dl/g, the mechanical strength tends to be lowered. On the other hand, when it exceeds 1.0 dl/g, the moldability tends to be deteriorated.

Starting dihydric phenols for the polycarbonate include 2,2-bis(4-hydroxyphenyl)propane, bis(4-hydroxyphenyl)methane, 2,2-bis(4-hydroxy-3-methylphenyl)propane, 4,4-bis(4-hydroxyphenyl)heptane, 2,2-bis(3,5-dichloro-4-hydroxyphenyl)propane, 2,2-bis(3,5-dibromo-4-hydroxyphenyl)propane, bis(3-chloro-4-hydroxyphenyl)methane, etc. These dihydric phenols can be used singly or in combination of two or more thereof.

A method for producing the polycarbonate is not critical and includes conventional methods such as a phosgen method in which a polycarbonate is produced by blowing phosgene through a mixture of a dihydric phenol, an aqueous caustic solution and a solvent, and a method in which a polycarbonate is produced by conducting ester interchange between a dihydric phenol and a carbonic acid diester in the presence of a catalyst.

When the low gloss agent is mixed with the polycarbonate, their blending proportions are preferably 10 to 50% by weight and 50 to 90% by weight, respectively. When the proportion of the low gloss agent is less than 10% by weight, the lowness of gloss of the composition tends to become insufficient. When it exceeds 50% by weight, the heat resistance of the composition tends to be lowered.

The low gloss agent of this invention can be made into a flame-retardant low gloss thermoplastic resin composition by mixing with a vinyl chloride resin.

The vinyl chloride resin used in this invention is usually a well-known one and includes vinyl chloride homopolymers, copolymers of vinyl chloride and other vinyl monomers (e.g. ethylene), etc. When the copolymer is used, the content of vinyl chloride in the copolymer is preferably 90% by weight or more from the viewpoint of flame retardancy.

When the low gloss agent is mixed with the vinyl chloride resin, their blending proportions are preferably 20 to 70% by weight and 80 to 30% by weight, respectively.

When the proportion of the vinyl chloride resin is less than 30% by weight, the flame retardancy is not sufficient and self-extinguishing properties cannot be attained. On the other hand, when it exceeds 80% by weight, the impact resistance and the heat distortion resistance tend to be deteriorated.

The low gloss agent can be mixed with any of the other copolymers by melt-kneading beads, powders or pellets of the individual component with a roll mill, screw mixer, Banbury mixer, kneader or the like. In such kneading or mixing, there can, if necessary, be added other resins, antioxidants, ultraviolet absorbers, flame retardants, pigments, glass fiber, plasticizers, etc.

The low gloss thermoplastic resin composition thus obtained is molded by a conventional method and used in the form of various molded articles.

The molded article obtained has a high impact resistance and a very low gloss because rubber particles derived from the low gloss agent are dispersed in a matrix composed of other resins and 30% by volume or more of the rubber particles are the non-spherical rubber particles described above.

This invention is further explained in more detail with reference to Examples and Comparative Examples, which are not by way of limitation but by way of illustration. In Examples and Comparative Examples, parts and percents are all by weight unless otherwise specified.

The characteristic values in these examples were measured by the following methods.

① Surface Gloss

Measured for the smooth surface of a colored plate (90×50×2 mm) obtained by molding, at an angle of incidence of 60° by means of a glossmeter VG-18 mfd. by NIPPON DENSHOKU KOGYO CO., LTD.

② Izod Impact Strength

Carried out in accordance with ASTM-D256 by use of a ⅛" (inch) notched specimen.

③ Du Pont Type Falling Weight Impact Strength (ASTM-D2794-69)

Carried out in a thin portion (1.5 mm) of a colored plate by means of a Du Pont type falling weight impact tester under the following conditions: tip R ¼" (inch), the diameter of hole of a pedestal ½" (inch).

④ Heat Distortion Temperature (HDT)

Heat resistance was measured in accordance with ASTM-D648 under conditions of ⅛" (inch) and about 18.56 kg/cm² (264 psi).

⑤ MFR (Melt Flow Rate)

Fluidity was measured at 230° C. at 10 kg in accordance with JIS K7210.

⑥ Appearance

The appearance of a molded article obtained was visually observed. The rating (mark) shown in the Tables was as follows:

o: The surface was uniform and not rough at all.
Δ: Nonuniformity of the surface was found by staring.
x: The surface was nonuniform and rough.

⑦ Tensile Strength

Measured in accordance with JIS K 7113 by use of a No. 1 specimen.

⑧ Elongation

Measured in accordance with JIS K 7113 by use of a No. 1 specimen.

⑨ Flame Retardancy

Measured according to the UL-94 specification.

EXAMPLE 1

Into a 150-liters autoclave were charged 16.4 kg of styrene, 95 g of t-dodecyl mercaptan and 5.5 g of 2,6-di-t-butyl-4-methylphenol. Then, 3.55 kg of a low-cis polybutadiene (NiPol, 1241ST, a trade name, mfd. by NIPPON ZEON CO., LTD.; microstructure of butadiene portion:vinyl:cis:trans=11:37:52; Mooney viscosity 35) was cut into small pieces and dispersed in the styrene monomer with stirring. Subsequently, the temperature was raised to 80° C. and maintained at 80° C. for 2 hours to dissolve the low-cis polybutadiene completely. The resulting solution was cooled to 50° C., and into the autoclave was charged a solution of 80 g of lauroyl peroxide and 89 g of diethylene glycol bis(t-butylperoxycarbonate) (Kayalene O, a trade name, mfd. by Kayaku AKZO CO., LTD.) in 680 g of styrene monomer. At the same time, 6.68 kg of acrylonitrile was charged, and the temperature was maintained at 50° C. In this case, the polymerization rate was 1%/hour. After 4 hours (at the time when the polymerization conversion became 4%), 47.7 kg of a 1.0% aqueous polyvinyl alcohol solution (W-24, a trade name, mfd. by DENKI KAGAKU KOGYO KABUSHIKI KAISHA) was added to carry out suspension polymerization. The polymerization diagram was as follows: polymerization was carried out at 80° C. for 2 hours, at 100° C. for 2 hours, and then at 110° C. for 3.5 hours, to complete the reaction. After completion of the polymerization, the reaction mixture was cooled to room temperature, and polymer beads were recovered by means of a centrifuge and dried. The dried beads were pelletized by means of an extruder (inner diameter of die:30 mm) to obtain a low gloss resin (a low gloss agent). Test pieces were molded out of the thus obtained pellets with an injection molding machine and evaluated. As the molding machine, KS-60B mfd. by Kanto Seiki Co., Ltd. was used. Cylinder temperatures of 260-260-240-200 (°C.) were employed as standard temperatures. The molding was conducted at an injection pressure of 400 kg/cm², 600 kg/cm² and 800 kg/cm², and there were measured characteristics of a molded article obtained at an injection pressure among them which did not cause short shot. The molding was conducted at a middle injection speed and a constant mold temperature of 60° C.

Figure 2:
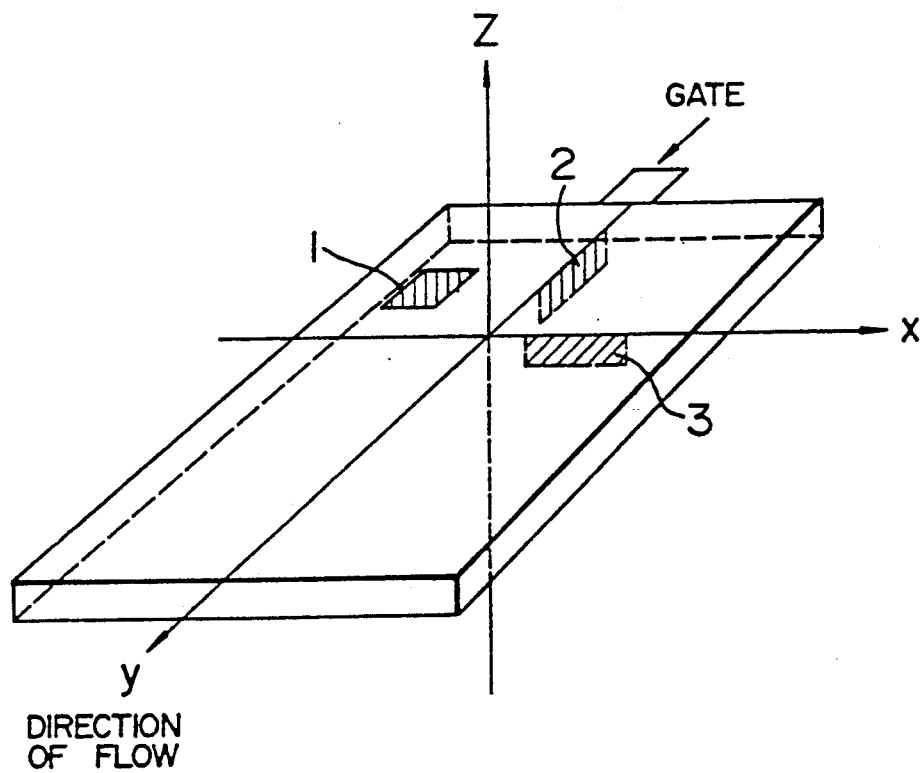
FIG. 2 is a perspective view of a molded article, i.e., a plate molded in an example of this invention.

The shape of rubber particles in the molded article was investigated (in the middle of a test piece, at the depth of approximately 40–50 μm from the surface layer) by preparing, as shown in FIG. 2, a sample from the molded article in each of the xy plane, yz plane and zx plane by OsO₄ stained ultra thin cross section, observing the sample by a transmission electron microscope (TEM), and photographing the same through the microscope at a magnification of 10,000.

In the present example, the content of non-spherical rubber particles was measured based on the area of non-spherical rubber particles in the photograph taken in the case of the yz plane.

Figure 3:
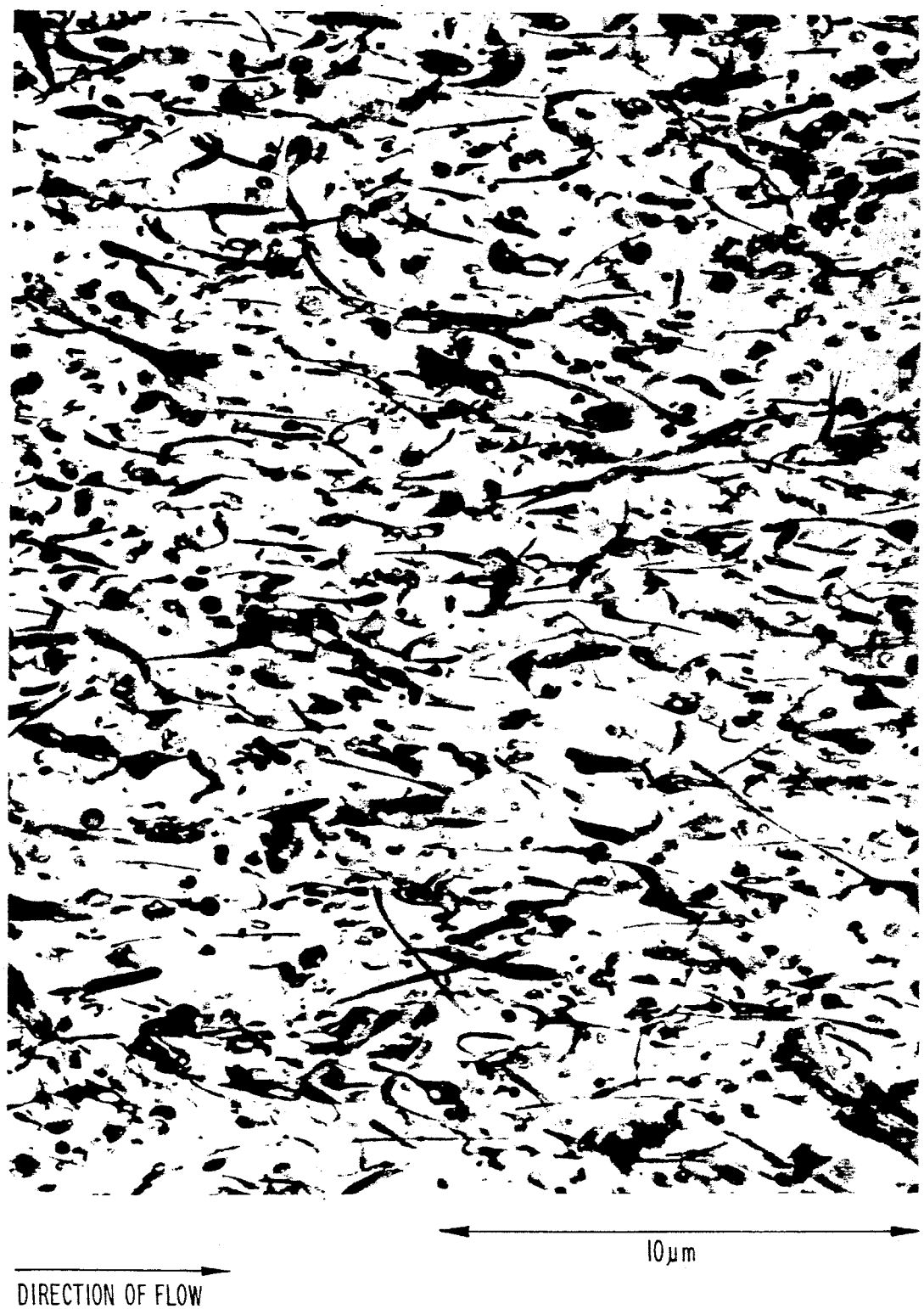
FIG. 3 is an electron micrograph (magnification:10,000) showing a particle structure which was taken for a sample prepared by cutting the molded article shown in FIG. 2 into a slice in the xy plane 1, and staining the slice by $OsO_4$ stained Ultra thin cross section.
Figure 4:
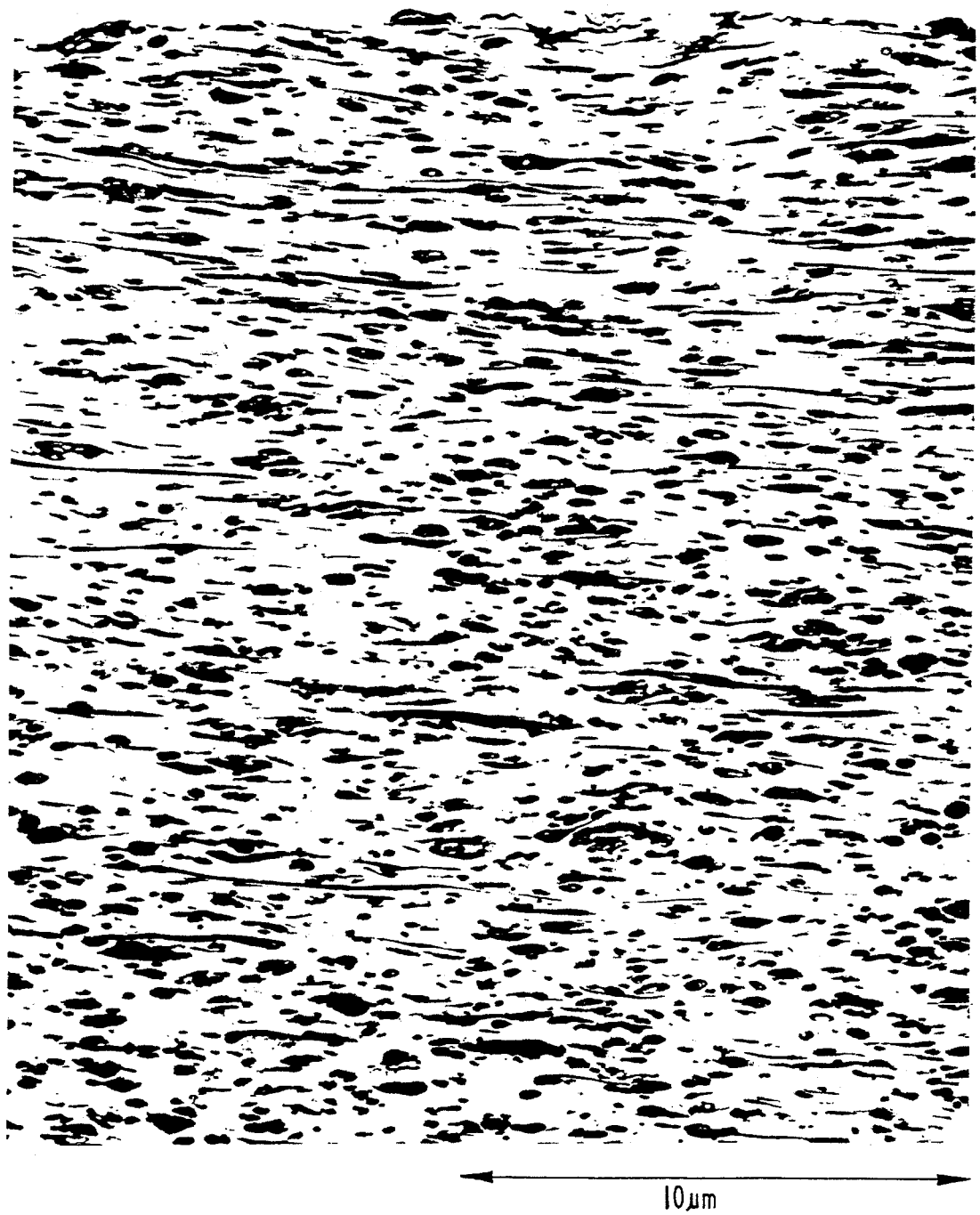
FIG. 4 is an electron micrograph which was taken in the same manner as in FIG. 3 for a slice cut out of the molded article in the yz plane 2 in FIG. 2.
Figure 5:
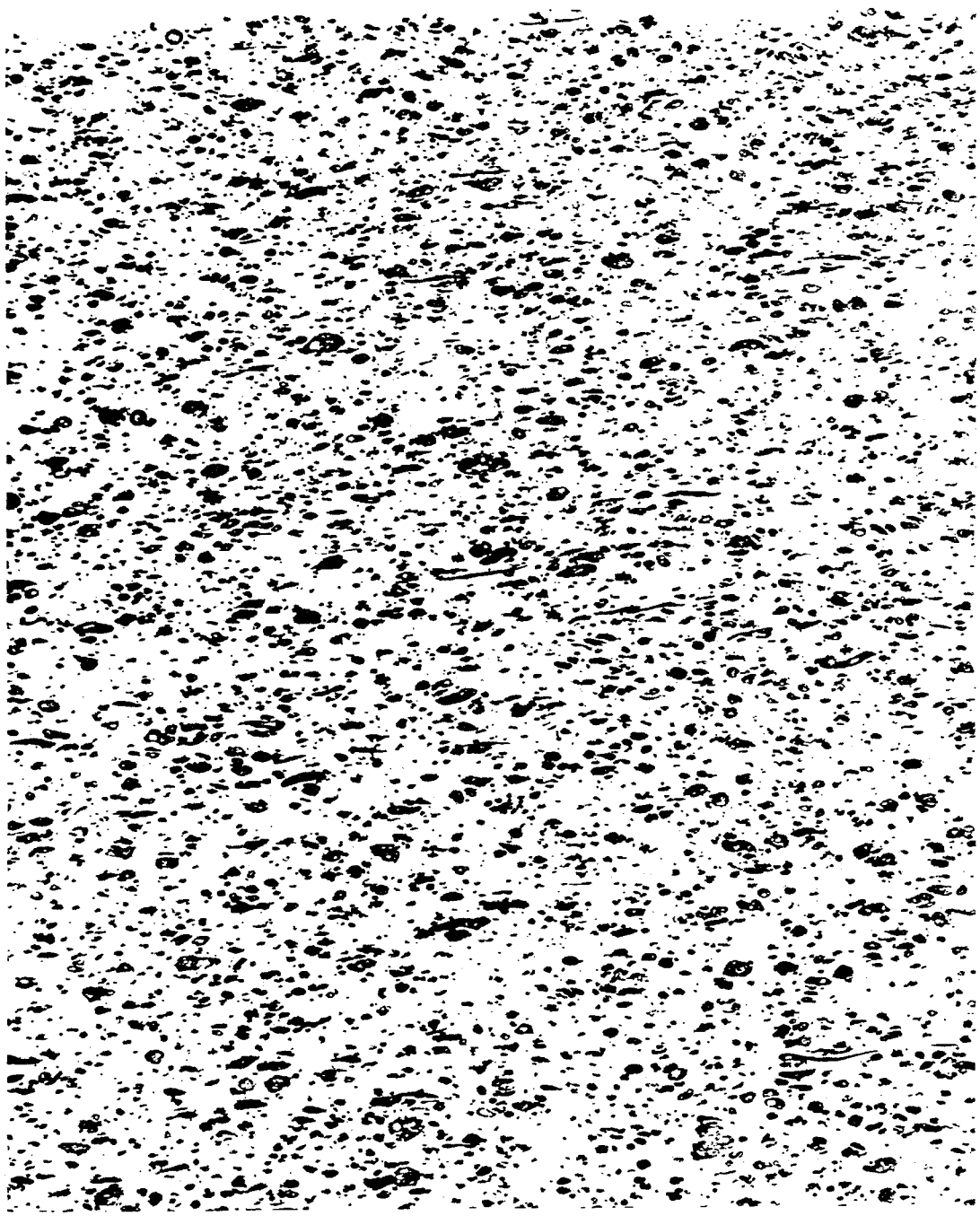
FIG. 5 is an electron micrograph which was taken in the same manner as in FIG. 3 for a slice cut out of the molded article in the zx plane 3 in FIG. 2.

FIG. 3, FIG. 4 and FIG. 5 are photographs taken for the molded article produced in Example 1.

EXAMPLE 2

The process of Example 1 was repeated except for changing the polymerization conversion at the time of switching bulk polymerization over to suspension polymerization to 1.5% (after 1.5 hours).

EXAMPLE 3

The process of Example 1 was repeated except for changing the using amount of lauroyl peroxide from 80 g of 120 g, changing the polymerization temperature (the maintained temperature) at the time of initiating polymerization from 50° C. to 55° C. (polymerization rate 3.3%/hr), and switching bulk polymerization over to suspension polymerization 4 hours after initiation of the bulk polymerization (at the time when the polymerization conversion became 13%).

COMPARATIVE EXAMPLE 1

The process of Example 1 was repeated except for changing the polymerization conversion at the time of switching bulk polymerization over to suspension polymerization to 0.5% (after 30 minutes).

COMPARATIVE EXAMPLE 2

The process of Example 1 was repeated except for changing the using amount of lauroyl peroxide from 80 g to 120 g, changing the polymerization temperature (the maintained temperature) at the time of initiating polymerization from 50° C. to 60° C., and switching bulk polymerization over to suspension polymerization 3 hours and 40 minutes after initiation of the bulk polymerization (at the time when the polymerization conversion became 18%).

COMPARATIVE EXAMPLE 3

The process of Comparative Example 2 was repeated except for changing the polymerization conversion at the time of switching bulk polymerization over to suspension polymerization to 25% (after 5 hours). The results of Examples 1, 2 and 3 and Comparative Examples 1, 2 and 3 are shown in Table 1.

COMPARATIVE EXAMPLES 4 to 7

Resins were synthesized in the same manner as in Example 1 except for changing the kinds of butadiene rubber, as shown in Table 2.

TABLE 1

| Item | Example 1 | Example 2 | Example 3 | Comparative Example 1 | Comparative Example 2 | Comparative Example 3 |
|---|---|---|---|---|---|---|
| Polymerization conversion at the time of bulk → suspension switchover (%) | 4 | 1.5 | 13 | 0.5 | 18 | 25 |
| Content of non-spherical rubber particles (%) | 80 | 90 | 50 | 5 | 25 | 10 |
| Surface gloss (%) | 14 | 20 | 10 | 60 | 8 | 7 |
| Izod impact strength (kg · cm/cm) | 32 | 28 | 27 | 22 | 7 | 6 |
| Falling weight impact strength (kg · cm) | 20 | 20 | 20 | 20 | 5 | 1.5 |
| HDT (°C.) | 95 | 95 | 95 | 95 | 94 | 94 |
| MFR (g/10 min) | 12 | 13 | 10 | 14 | 8 | 6 |
| Appearance | ○ | ○ | ○ | ○ | x | x |

TABLE 2

| | Comparative Example 4 | Comparative Example 5 | Comparative Example 6 | Comparative Example 7 |
|---|---|---|---|---|
| Rubber properties | | | | |
| Rubber grade | NiPol 1242 S* | NiPol 1220 SB* | NiPol 1220 SL* | NiPol NS 310* |
| Microstructure | | | | |
| Vinyl | 11 | 1 | 1 | SBR having a styrene content of 17% |
| Cis | 37 | 98 | 98 | |
| Trans | 52 | 1 | 1 | |
| Mooney viscosity (100° C.) | 55 | 50 | 30 | 50 |
| Dissolution time | 8 hours | 8 hours | 2 hours | 2 hours |
| Workability | Poor | Poor | Good | Good |
| Physical Properties | | | | |
| Content of non-spherical particles | 80 | 40 | 20 | 0 |
| Surface gloss (%) | 21 | 12 | 40 | 94 |
| Izod impact strength (kg · cm/cm) | 7 | 11 | 12 | 13 |
| Falling weight impact strength (kg · cm) | 1.5 | 1.5 | 1.5 | 20 |
| HDT (°C.) | 91 | 88 | 90 | 92 |
| MFR (g/10 min) | 10 | 8 | 18 | 16 |
| Appearance | ○ | ○ | ○ | ○ |

*All manufactured by NIPPON ZEON CO., LTD

Note: Dissolution time is a time required for complete dissolution of each rubber component, and was measured by stopping stirring of the system at intervals of 1 hour, visually judging the existence of undissolved rubber which rose to the surface, measuring a time required for disappearance of the undissolved rubber, and taking this time as dissolution time. workability was rated as poor when the above dissolution time was 5 hours or more, and it was rated as good when the dissolution time was less than 5 hours.

In Comparative Example 4, NiPol 1242S (a low-cis polybutadiene mfd. by NIPPON ZEON CO., LTD.) was used. In this case, the Mooney viscosity was high, the dissolution workability was poor, and the falling weight impact strength of the resulting resin was low. In Comparative Examples 5 and 6, NiPol 1220 SB and NiPol 1220 SL (high-cis polybutadienes mfd. by NIPPON ZEON CO., LTD.) were used, respectively. Also in this case, the falling weight impact strength was low. In Comparative Example 7, NiPol NS 310 (a styrene-butadiene copolymer rubber mfd. by NIPPON ZEON CO., LTD.) was used. In this case, the surface gloss was 94%, namely, no low gloss imparting effect could be obtained.

EXAMPLES 4 TO 6

The process of Example 1 was repeated except for changing the content of the rubber component in low gloss agent from 13% (in Example 1) to 5%, 10% or 15%.

TABLE 3

|  | Example | | |
|---|---|---|---|
|  | 4 | 5 | 6 |
| Rubber content (wt %) | 5 | 10 | 15 |
| Content of non-spherical rubber particles (%) | 78 | 80 | 80 |
| Surface gloss (%) | 25 | 18 | 8 |
| Izod impact strength (kg · cm/cm) | 20 | 27 | 35 |
| Falling weight impact strength (kg · cm) | 15 | 20 | 20 |
| HDT (°C.) | 98 | 96 | 92 |
| MFR (g/10 min) | 20 | 15 | 6 |
| Appearance | ○ | ○ | ○ |

EXAMPLE 7

Low gloss thermoplastic resin compositions were obtained by adding the low gloss agent obtained in Example 1 to an AAS resin (VITAX V6700, mfd. by Hitachi Chemical Co., Ltd.) which was an acrylonitrile-butyl acrylate-styrene copolymer, in each proportion (parts by weight; hereinafter the same applied) shown in Table 4, mixing them in a Henschel mixer, and pelletizing the resulting mixture by means of an extruder (inner diameter of die:30 mm). In the same manner as in Example 1, test pieces were molded out of the thus obtained pellets with an injection molding machine and evaluated. The results obtained are shown in Table 4.

TABLE 4

| Composition | Low gloss agent of Example 1 | 70 | 50 | 30 |
|---|---|---|---|---|
|  | AAS resin | 30 | 50 | 70 |
| Characteristics | Surface gloss (%) | 10 | 18 | 28 |
|  | Izod impact strength (kg · cm/cm) | 28 | 24 | 21 |
|  | Du Pont type falling weight impact strength (kg · cm) | 20 | 20 | 20 |
|  | HDT (°C) | 95 | 93 | 91 |
|  | MFR (g/10 min) | 13 | 15 | 17 |

EXAMPLE 8

The low gloss agent obtained in Example 1 was blended with an AES resin (#110, mfd. by Japan Synthetic Rubber Co., Ltd.) which was an acrylonitrile-ethylene propylene diene-styrene copolymer, in each proportion shown in Table 5, and evaluation was carried out in the same manner as in Example 7. The results obtained are shown in Table 5.

TABLE 5

| Composition | Low gloss agent of Example 1 | 70 | 50 | 30 |
|---|---|---|---|---|
|  | AES resin | 30 | 50 | 70 |
| Characteristics | Surface gloss (%) | 17 | 25 | 40 |
|  | Izod impact strength (kg · cm/cm) | 28 | 30 | 33 |
|  | Du Pont type falling weight impact strength (kg · cm) | 20 | 20 | 20 |
|  | HDT (°C.) | 91 | 92 | 93 |
|  | MFR (g/10 min) | 18 | 20 | 25 |

EXAMPLE 9

The low gloss agent obtained in Example 1 was blended with an ABS resin (Kralastic 2938A, mfd. by Sumitomo Naugatuck Co., Ltd.) which was an acrylonitrile-butadiene-styrene copolymer, in each proportion shown in Table 6, and evaluation was carried out in the same manner as in Example 7. The results obtained are shown in Table 6.

TABLE 6

| Composition | Low gloss agent of Example 1 | 70 | 50 | 30 |
|---|---|---|---|---|
|  | ABS resin | 30 | 50 | 70 |
| Characteristics | Surface gloss (%) | 20 | 26 | 30 |
|  | Izod impact strength (kg · cm/cm) | 35 | 35 | 36 |
|  | Du Pont type falling weight impact strength (kg · cm) | 25 | 25 | 25 |
|  | HDT (°C.) | 91 | 92 | 93 |
|  | MFR (g/10 min) | 9 | 9 | 8 |

EXAMPLE 10

The low gloss agent obtained in Example 1 was blended with a refractory AAS resin (VITARD VT 2001, mfd. by Hitachi Chemical Co., Ltd.) which was an acrylonitrile-butyl acrylate-α-methylstyrene-N-phenylmaleimide copolymer, in each proportion shown in Table 7, and evaluation was carried out in the same manner as in Example 7. The results obtained are shown in Table 7.

TABLE 7

| Composition | Low gloss agent of Example 1 | 70 | 50 | 30 |
|---|---|---|---|---|
|  | VITARD VT-2001 | 30 | 50 | 70 |
| Characteristics | Surface gloss (%) | 25 | 30 | 40 |
|  | Izod impact strength (kg · cm/cm) | 12 | 10 | 8 |
|  | Du Pont type falling weight impact strength (kg · cm) | 15 | 10 | 7.5 |
|  | HDT (°C.) | 95 | 100 | 100 |
|  | MFR (g/10 min) | 10 | 8 | 6 |
|  | Appearance | ○ | ○ | ○ |

EXAMPLE 11

A low gloss agent was produced in the same manner as in Example 1 except for changing the polymerization conversion at the time of switching over to suspension polymerization to 2% (after 2 hours). With 50 parts of the low gloss agent was blended 50 parts of VITAX V6700, and evaluation was carried out in the same manner as in Example 7. The results obtained are shown in Table 8.

EXAMPLE 12

A low gloss agent was produced in the same manner as in Example 3 except for changing the polymerization conversion at the time of switching over to suspension polymerization to 10% (after 3 hours). With 50 parts of the low gloss agent was blended 50 parts of VITAX V6700, and evaluation was carried out in the same manner as in Example 7. The results obtained are shown in Table 8.

COMPARATIVE EXAMPLE 8

A low gloss agent was produced in the same manner as in Example 1 except that suspension polymerization was carried out from the beginning without conducting bulk polymerization. With 50 parts of the low gloss agent was blended 50 parts of VITAX V6700, and evaluation was carried out in the same manner as in Example 7. The results obtained are shown in Table 8.

COMPARATIVE EXAMPLE 9

The process of Comparative Example 8 was repeated except for using the low gloss agent of Comparative Example 1.

COMPARATIVE EXAMPLE 10

The process of Comparative Example 8 was repeated except for using the low gloss agent of Comparative Example 2.

COMPARATIVE EXAMPLE 11

The process of Comparative Example 8 was repeated except for using the low gloss agent of Comparative Example 3.

TABLE 8

| | | Example | | Comparative Example | | | |
|---|---|---|---|---|---|---|---|
| | | 11 | 12 | 8 | 9 | 10 | 11 |
| Characteristics | Surface gloss (%) | 20 | 17 | 90 | 78 | 15 | 13 |
| | Izod impact strength (kg · cm/cm) | 22 | 25 | 16 | 19 | 19 | 14 |
| | Du Pont type falling weight impact strength (kg · cm) | 20 | 20 | 20 | 20 | 20 | 20 |
| | HDT (°C.) | 93 | 93 | 93 | 93 | 93 | 92 |
| | MFR (g/10 min) | 15 | 15 | 15 | 15 | 14 | 14 |
| | Appearance | ○ | ○ | ○ | ○ | Δ | Δ |

COMPARATIVE EXAMPLES 12 TO 15

The process of Comparative Example 8 was repeated except for using each of the low gloss agents listed in Table 9 which were different in the kind of butadiene rubber.

TABLE 9

| | Comparative Example | | | |
|---|---|---|---|---|
| | 12 | 13 | 14 | 15 |
| Low gloss agent | Comparative Example 4 | Comparative Example 5 | Comparative Example 6 | Comparative Example 7 |
| Physical properties | | | | |
| Surface gloss (%) | 27 | 15 | 51 | 98 |
| Izod impact strength (kg · cm/cm) | 9 | 10 | 11 | 10 |
| Du Pont type falling weight impact strength (kg · cm) | 1.5 | 1.5 | 1.5 | 1.5 |
| HDT (°C.) | 91 | 89 | 90 | 89 |
| MFR (g/10 min) | 14 | 12 | 20 | 21 |
| Appearance | ○ | ○ | ○ | ○ |

EXAMPLES 13 TO 15

The process of Comparative Example 8 was repeated except for using each of the low gloss agents listed in Table 10 which were different in the proportion of low-cis butadiene rubber component (BR 1241ST).

TABLE 10

| | Example | | |
|---|---|---|---|
| | 13 | 14 | 15 |
| Low gloss agent | Example 4 | Example 5 | Example 6 |
| Physical properties | | | |
| Surface gloss (%) | 26 | 20 | 9 |
| Izod impact strength (kg · cm/cm) | 18 | 24 | 27 |
| Du Pont type falling weight impact strength (kg · cm) | 15 | 20 | 20 |
| HDT (°C.) | 94 | 93 | 92 |
| MFR (g/10 min) | 20 | 17 | 13 |
| Appearance | ○ | ○ | ○ |

EXAMPLES 16 TO 22

The low gloss agent obtained in Example 1 and a polycarbonate (Iupilon S-1000, a trade name, mfd. by Mitsubishi Gas Chemical Co., Ltd., starting mainly from bisphenol A:Mn about 10,000 intrinsic viscosity 0.6 dl/g as measured in methylene chloride) were mixed in the proportions shown in Table 11 in a Henschel mixer and pelletized by means of an extruder (inner diameter of die:30 mm). Test pieces were molded out of the thus obtained pellets with an injection molding machine and evaluated. The results obtained are shown in Table 11.

TABLE 11

| | Example | | | | | | |
|---|---|---|---|---|---|---|---|
| | 16 | 17 | 18 | 19 | 20 | 21 | 22 |
| Composition | | | | | | | |
| Low gloss agent | 10 | 20 | 30 | 50 | 7 | 55 | 70 |
| Polycarbonate | 90 | 80 | 70 | 50 | 93 | 65 | 30 |
| Characteristics | | | | | | | |
| Surface gloss | 45 | 35 | 30 | 25 | 80 | 22 | 30 |
| Izod impact strength (kg · cm/cm) | 65 | 63 | 60 | 50 | 67 | 35 | 30 |
| Falling weight impact (kg · cm) | 100 | 100 | 100 | 100 | 100 | 30 | 25 |
| HDT (°C.) | 132 | 125 | 122 | 118 | 133 | 105 | 100 |
| MFR (g/10 min) | 10 | 9 | 9 | 8 | 10 | 8 | 7 |

As is clear from Table 11, when the low gloss agent was blended with the polycarbonate in a proportion of 10 to 50% by weight, the balance between gloss and impact strength was particularly good.

COMPARATIVE EXAMPLES 16 TO 19

With 70 parts of the polycarbonate was blended 30 parts of each of the low gloss agents of Comparative Examples 4 to 7 which were different in the kind of butadiene rubber as shown in Table 12, and evaluation was carried out in the same manner as in Example 16.

TABLE 12

| | Comparative Example 16 | Comparative Example 17 | Comparative Example 18 | Comparative Example 19 |
|---|---|---|---|---|
| Rubber properties | | | | |
| Rubber grade | NiPol 1242S | NiPol 1220SB | NiPol 1220SL | NiPol NS310 |

TABLE 12-continued

|  | Comparative Example 16 | Comparative Example 17 | Comparative Example 18 | Comparative Example 19 |
| --- | --- | --- | --- | --- |
| Microstructure |  |  |  |  |
| Vinyl | 11 | 1 | 1 | SBR having a styrene content of 17% |
| Cis | 37 | 98 | 98 |  |
| Trans | 52 | 1 | 1 |  |
| Mooney viscosity (100° C.) | 55 | 50 | 30 | 50 |
| Dissolution time | 8 hours | 8 hours | 2 hours | 2 hours |
| Workability | Poor | Poor | Good | Good |
| Characteristics |  |  |  |  |
| Surface gloss (%) | 35 | 25 | 60 | 98 |
| Izod impact strength (kg · cm/cm) | 14 | 15 | 20 | 20 |
| Falling weight impact | 10 | 10 | 10 | 100 |
| HDT (°C.) | 121 | 121 | 122 | 122 |
| MFR (g/10 min) | 7 | 6 | 11 | 12 |

COMPARATIVE EXAMPLES 20 TO 22

With 70 parts of the polycarbonate was blended 30 parts of each of the low gloss agents of Comparative Examples 1 to 3 synthesized by changing the polymerization conversion at the time of switching bulk polymerization over to suspension polymerization to 0.5%, 18% or 25%, respectively, and evaluation was carried out in the same manner as in Example 16. The results obtained are shown in Table 13.

TABLE 13

|  | Comparative Example | | |
| --- | --- | --- | --- |
|  | 20 | 21 | 22 |
| Polymerization conversion at the time of bulk→suspension switchover | 0.5 | 18 | 25 |
| Surface gloss (%) | 80 | 15 | 13 |
| Izod impact strength (kg · cm/cm) | 55 | 20 | 15 |
| Falling weight impact strength (kg · cm) | 100 | 30 | 10 |
| HDT (°C.) | 122 | 122 | 120 |
| MFR (g/10 min) | 9 | 5 | 4 |

EXAMPLES 23 TO 24

With 70 parts of the polycarbonate was blended 30 parts of each of the low gloss agents of Examples 4 and 6 synthesized by changing the content of the rubber component in low gloss agent to 5% or 15%, respectively, and evaluation was carried out in the same manner as in Example 16. The results obtained are shown in Table 14.

TABLE 14

|  | Example | |
| --- | --- | --- |
|  | 23 | 24 |
| Rubber content (%) | 5 | 15 |
| Surface gloss (%) | 40 | 25 |
| Izod impact strength (kg · cm/cm) | 50 | 65 |
| Falling weight impact strength (kg · cm) | 100 | 100 |
| HDT (°C.) | 123 | 121 |
| MFR (g/10 min) | 10 | 9 |

EXAMPLES 25 TO 29 AND COMPARATIVE EXAMPLE 23

An ethylene-vinyl chloride copolymer (Ryuron E-430, mfd. by Tosoh Corp.) which was a vinyl chloride resin, and the low gloss agent of Example 1 were mixed in the proportions shown in Table 15 in a Henschel mixer and pelletized by means of an extruder (inner diameter of die:30 mm). Test pieces were molded out of the thus obtained pellets with an injection molding machine and evaluated.

TABLE 15

|  | Example | | | | | Comparative Example |
| --- | --- | --- | --- | --- | --- | --- |
|  | 25 | 26 | 27 | 28 | 29 | 23 |
| Composition |  |  |  |  |  |  |
| Vinyl chloride resin | 30 | 40 | 60 | 80 | 20 | 100 |
| Low gloss agent | 70 | 60 | 40 | 20 | 80 | 0 |
| Characteristics |  |  |  |  |  |  |
| Surface gloss (%) | 18 | 30 | 60 | 80 | 14 | 100 |
| Izod impact strength (kg · cm/cm) | 14 | 5.5 | 3.8 | 3.7 | 18 | 2.6 |
| Du Pont type falling weight impact strength (kg · cm) | 60 | 70 | 90 | 100 | 45 | 15 |
| Tensile strength (kg/cm²) | 490 | 502 | 505 | 514 | 474 | 447 |
| Elongation (%) | 120 | 143 | 115 | 150 | 102 | 20 |
| HDT (°C.) | 82 | 80 | 76 | 72 | 83 | 68 |
| MFR* (g/10 min) | 2.0 | 2.4 | 5.3 | 10.7 | 1.1 | 18.1 |
| Flame retardancy | V-0 | V-0 | V-0 | V-0 | V-1 | V-0 |

*Measured for each mixture with the vinyl chloride resin at 190° C. and 5 kg in accordance with JIS K 7210.

From Table 15, it can be seen that when the low gloss agent was mixed with the vinyl chloride resin in a proportion of 20 to 70% by weight, the balance among the characteristics is particularly good.

COMPARATIVE EXAMPLES 24 TO 27

With 60 parts of Ryuron E-430 was blended 40 parts of each of the low gloss agents of Comparative Examples 4 to 7 obtained in the same manner as in Example 1 except for changing the kind of butadiene rubber as shown in Table 16, and comparison was made in the same manner as in Example 25.

TABLE 16

|  | Comparative Example | | | |
| --- | --- | --- | --- | --- |
|  | 24 | 25 | 26 | 27 |
| Rubber properties |  |  |  |  |
| Rubber grade | NiPol 1242 S* | NiPol 1220 SB* | NiPol 1220 SL* | NiPol NS 310* |
| Microstructure |  |  |  |  |
| Vinyl | 11 | 1 | 1 | SBR having a styrene content of 17% |
| Cis | 37 | 98 | 98 |  |
| Trans | 52 | 1 | 1 |  |

TABLE 16-continued

| | Comparative Example | | | |
|---|---|---|---|---|
| | 24 | 25 | 26 | 27 |
| Mooney viscosity (100° C.) | 55 | 50 | 30 | 50 |
| Dissolution time | 8 hours | 8 hours | 2 hours | 2 hours |
| Workability | Poor | Poor | Good | Good |
| Characteristics | | | | |
| Surface gloss (%) | 30 | 28 | 80 | 100 |
| Izod impact strength (kg · cm/cm) | 5.0 | 5.8 | 3.0 | 3.0 |
| Du Pont type falling weight impact | 10 | 10 | 10 | 100 |
| HDT (°C.) | 80 | 80 | 80 | 79 |
| MFR (g/10 min) | 2.5 | 2.5 | 2.4 | 3.0 |
| Flame retardancy | V-0 | V-0 | V-0 | V-0 |

COMPARATIVE EXAMPLES 28 TO 30

With 60 parts of Ryuron E-430 was blended 40 parts of each of the low gloss agents of Comparative Examples 1 to 3 synthesized by changing the polymerization conversion at the time of switching bulk polymerization over to suspension polymerization to 0.5%, 18% or 25%, respectively, and evaluation was carried out in the same manner as in Example 25. The results obtained are shown in Table 17.

TABLE 17

| | Comparative Example | | |
|---|---|---|---|
| | 28 | 29 | 30 |
| Polymerization conversion at the time of bulk→ suspension switchover | 0.5 | 18 | 25 |
| Characteristics | | | |
| Surface gloss (%) | 90 | 20 | 15 |
| Izod impact strength (kg · cm/cm) | 5.0 | 4.5 | 4.0 |
| Du Pont type falling weight impact strength (kg · cm) | 70 | 50 | 40 |
| HDT (°C.) | 79 | 80 | 80 |
| MFR (g/10 min) | 2.5 | 2.4 | 2.4 |
| Flame retardancy | V-0 | V-0 | V-0 |
| Appearance | ○ | x | x |

EXAMPLES 30 AND 31

With 60 parts of Ryuron E-430 was blended 40 parts of each of the low gloss agents of Examples 4 and 6 synthesized by changing the content of the rubber component in low gloss agent to 5% or 15%, respectively, and evaluation was carried out in the same manner as in Example 25. The results obtained are shown in Table 18.

TABLE 18

| | Example | |
|---|---|---|
| | 30 | 31 |
| Rubber content (%) | 5 | 15 |
| Characteristics | | |
| Surface gloss % | 60 | 20 |
| Izod impact strength (kg · cm/cm) | 4.0 | 6.0 |
| Du pont type falling weight impact strength (kg · cm) | 70 | 90 |
| HDT (°C.) | 81 | 80 |
| MFR (g/10) | 2.4 | 2.4 |
| Flame retardancy | V-0 | V-0 |

EXAMPLES 32 TO 33 AND COMPARATIVE EXAMPLE 31

A vinyl chloride resin having a polymerization degree of 810 (TH-800, a vinyl chloride homopolymer mfd. by Tosoh Corp.) and the low gloss agent of Example 1 were blended in the proportions shown in Table 19, and evaluation was carried out in the same manner as in Example 25.

TABLE 19

| | Example | | Comparative Example |
|---|---|---|---|
| | 32 | 33 | 31 |
| Composition | | | |
| Vinyl chloride resin (a) | 40 | 60 | 100 |
| Grafted copolymer (b) | 60 | 40 | 0 |
| Characteristics | | | |
| Surface gloss (%) | 20 | 50 | 98 |
| Izod impact strength (kg · cm/cm) | 15.0 | 10.0 | 6.2 |
| Du Pont type falling weight impact strength (kg · cm) | 100 | 100 | 20 |
| Tensile strength (kg/cm$^2$) | 600 | 610 | 550 |
| Elongation (%) | 140 | 150 | 110 |
| HDT (°C.) | 83 | 75 | 71 |
| MFR (g/10 min) | 1.0 | 1.2 | 1.4 |
| Flame retardancy | V-0 | V-0 | V-0 |

EXAMPLE 34

Into a 150-liters autoclave were charged 16.4 kg of styrene, 47.5 g (0.2% based on the total weight of monomer constituents) of t-dodecyl mercaptan and 5.5 g of 2,6-di-t-butyl-4-methylphenol. Then, 3.55 kg of a low-cis polybutadiene (NiPol 1241ST, a trade name, mfd. by NIPPON ZEON CO., LTD.; microstructure of butadiene portion:vinyl:cis:trans=11:37:52; Mooney viscosity 35) was cut into small pieces and dispersed in the styrene monomer with stirring. Subsequently, the temperature was raised to 80° C. and maintained at 80° C. for 2 hours to dissolve the low-cis polybutadiene completely. The resulting solution was cooled to 50° C., and into the autoclave was charged a solution of 119 g (0.5% based on the total weight of monomer constituents) of lauroyl peroxide and 89 g of diethylene glycol bis(t-butylperoxycarbonate) (Kayalene O, a trade name, mfd. by Kayaku AKZO CO., LTD.) in 680 g of styrene monomer. At the same time, 6.68 kg of acrylonitrile was charged, and the temperature was maintained at 50° C. for 1.5 hours. At this time, the polymerization conversion was 5%.

Then, 47.7 kg of a 1.0% aqueous polyvinyl alcohol solution (W-24, a trade name, mfd. by DENKI KAGAKU KOGYO KABUSHIKI KAISHA) was added to carry out suspension polymerization. As to the polymerization diagram, the polymerization temperature was raised stepwise, namely, polymerization was carried out at 80° C. for 2 hours, at 100° C. for 2 hours, and the at 110° C. for 2 hours. After completion of the polymerization, the reaction mixture was cooled to room temperature, and polymer beads were recovered by means of a centrifuge and dried. The dried beads were pelletized by use of an extruder (inner diameter of die:30 mm) to obtain a low gloss resin (a low gloss agent). Test pieces were molded out of the thus obtained pellets with an injection molding machine and evaluated.

As the molding machine, KS-60B mfd. by Kanto Seiki Co., Ltd. was used. Cylinder temperatures of 260-260-240-220° C. were employed as standard temperatures. The molding was conducted at an injection pressure of 400 kg.f/cm$^2$, 600 kg.f/cm$^2$ and 800 kg.f/cm$^2$, and there were measured characteristics of a molded article obtained at an injection pressure among then which did not cause short shot. The molding was conducted at a middle injection speed and a constant mold temperature of 60° C.

The molecular weight of acetone soluble part was measured as follows. A portion of the resin which was soluble in acetone was measured by means of a chromatographic apparatus [mfd. by Millipore Corporation (Waters Chromatography div.)] according to gel permeation chromatography. The molecular weight was expressed in terms of standard polystyrene.

EXAMPLES 35 TO 39

The process of Example 34 was repeated except for changing the amount of the molecular weight modifier t-dodecyl mercaptan to each amount shown in Table 20, and evaluation was carried out in the same manner as in Example 34. The results obtained are shown in Table 20. As is clear from Table 20, in Example 39 in which the molecular weight of acetone soluble part was 90,000, MER was good but the Izod impact strength tends to be lowered.

TABLE 20

| | Example | | | | | |
|---|---|---|---|---|---|---|
| | 34 | 35 | 36 | 37 | 38 | 39 |
| t-Dodecyl mercaptan (%) | 0.2 | 0 | 0.1 | 0.3 | 0.4 | 0.5 |
| Molecular weight of acetone soluble part (× 10$^4$) | 22 | 54 | 35 | 17 | 11 | 9 |
| Izod impact strength (kg · cm/cm) | 45 | 55 | 50 | 40 | 30 | 17 |
| Surface gloss (%) | 12 | 10 | 10 | 13 | 14 | 18 |
| HDT (°C.) | 95 | 95 | 94 | 94 | 94 | 94 |
| MFR (g/10 min) | 1.0 | 0.1 | 0.5 | 4.3 | 11 | 18 |

EXAMPLES 40 TO 43

The process of Example 34 was repeated except for using no t-dodecyl mercaptan and changing the amount of lauroyl peroxide to 0.6%, 0.7%, 0.8% or 0.4%, respectively. The results obtained are shown in Table 21. In Example 43, the molecular weight was increased too much, so that MFR was decreased.

TABLE 21

| | Example 40 | Example 41 | Example 42 | Example 43 |
|---|---|---|---|---|
| Lauroyl peroxide (%) | 0.6 | 0.7 | 0.8 | 0.4 |
| Molecular weight of acetone soluble part (× 10$^4$) | 50 | 42 | 38 | 65 |
| Izod impact strength (kg · cm/cm) | 53 | 50 | 50 | 40 |
| Surface gloss (%) | 12 | 12 | 13 | 12 |
| Falling weight impact strength (kg · cm) | 20 | 20 | 20 | 10 |
| HDT (°C.) | 95 | 95 | 95 | 95 |
| MFR (g/10 min) | 0.4 | 0.5 | 0.6 | 0.03 |

EXAMPLES 44 TO 46

The process of Example 34 was repeated except for changing the content of the rubber component in low gloss agent from 13% (in Example 34) to 5%, 10%, or 15%, respectively. The results obtained are shown in Table 22.

TABLE 22

| | Example | | |
|---|---|---|---|
| | 44 | 45 | 46 |
| Rubber content (wt %) | 5 | 10 | 15 |
| Molecular weight of acetone soluble part (× 10$^4$) | 21 | 22 | 22 |
| Izod impact strength (kg · cm/cm) | 30 | 37 | 50 |
| Surface gloss (%) | 20 | 13 | 8 |
| Falling weight impact strength (kg · cm) | 20 | 20 | 20 |
| HDT (°C.) | 98 | 96 | 92 |
| MFR (g/10 min) | 15 | 10 | 0.5 |

COMPARATIVE EXAMPLES 32 TO 34

Resins were synthesized in the same manner as in Example 34 except for changing the polymerization conversion at the time of switching bulk polymerization over to suspension polymerization as shown in Table 23, and evaluation was carried out in the same manner as in Example 34.

TABLE 23

| | Comparative Example 32 | Comparative Example 33 | Comparative Example 34 |
|---|---|---|---|
| Polymerization conversion at the time of bulk → suspension switchover (%) | 0.5 | 20 | 30 |
| Surface gloss (%) | 70 | 8 | 7 |
| Izod impact strength (kg · cm/cm) | 20 | 7 | 6 |
| Falling weight impact strength (kg · cm) | 20 | 5 | 1.5 |
| HDT (°C.) | 95 | 94 | 94 |
| MFR (g/10 min) | 14 | 8 | 6 |

COMPARATIVE EXAMPLES 35 TO 38

Resins were synthesized in the same manner as in Example 34 except for changing the kind of butadiene rubber as shown in Table 24, and evaluation was carried out in the same manner as in Example 34.

TABLE 24

| | Comparative Example 35 | Comparative Example 36 | Comparative Example 37 | Comparative Example 38 |
|---|---|---|---|---|
| Rubber properties | | | | |
| Rubber grade | NiPol 1242S | NiPol 1220SB | NiPol 1220SL | NiPol NS 310 |
| Microstructure | | | | |
| Vinyl | 11 | 1 | 1 | SBR (styrene content: 17%) |
| Cis | 37 | 98 | 98 | |
| Trans | 52 | 1 | 1 | |
| Mooney viscosity (100° C.) | 55 | 50 | 30 | 50 |
| Dissolution time | 8 hours | 8 hours | 2 hours | 2 hours |
| Workability Characteristics | Poor | Poor | Good | Good |
| Surface gloss (%) | 20 | 12 | 40 | 95 |

TABLE 24-continued

|  | Comparative Example 35 | Comparative Example 36 | Comparative Example 37 | Comparative Example 38 |
| --- | --- | --- | --- | --- |
| Izod impact strength (kg · cm/cm) | 7 | 11 | 12 | 13 |
| Falling weight impact strength (kg · cm) | 1.5 | 1.5 | 1.5 | 20 |
| HDT (°C.) | 91 | 88 | 90 | 90 |
| MFR (g/10 min) | 10 | 8 | 18 | 16 |

EXAMPLE 47

Low gloss resin compositions were obtained by blending the resin (the low gloss agent) obtained in Example 34 and an AAS resin (VITAX V6810, mfd. by Hitachi Chemical Co., Ltd.) which was an acrylonitrile-butyl acrylate-styrene copolymer, in the proportions shown in Table 25, and pelletizing the blend by means of an extruder (inner diameter of die:30 mm). Test pieces were molded out of the pellets of each resin composition by using an injection molding machine and evaluated.

TABLE 25

| Composition | Resin of Example 34 | 70 | 50 | 30 |
| --- | --- | --- | --- | --- |
|  | AAS resin | 30 | 50 | 70 |
| Characteristics | Surface gloss (%) | 14 | 16 | 18 |
|  | Izod impact strength (kg · cm/cm) | 42 | 41 | 30 |
|  | Falling weight impact strength (kg · cm) | 20 | 20 | 20 |
|  | HDT (°C.) | 89 | 90 | 92 |
|  | MFR (g/10 min) | 1.5 | 2.0 | 5.0 |

EXAMPLE 48

Low gloss resin compositions were obtained in the same manner as in Example 47 except for blending an AES RESIN (#110, mfd. by Japan Synthetic Rubber Co., Ltd.) which was an acrylonitrile-ethylene propylene diene-styrene copolymer, in place of the AAS resin, in each proportion shown in Table 26, and evaluation was carried out in the same manner as in Example 47.

TABLE 26

| Composition | Resin of Example 34 | 70 | 50 | 30 |
| --- | --- | --- | --- | --- |
|  | AES resin | 30 | 50 | 70 |
| Characteristics | Surface gloss (%) | 15 | 23 | 25 |
|  | Izod impact strength (kg · cm/cm) | 42 | 38 | 35 |
|  | Falling weight impact strength (kg · cm) | 20 | 20 | 20 |
|  | HDT (°C.) | 91 | 92 | 93 |
|  | MFR (g/10 min) | 1.8 | 2.5 | 6.0 |

EXAMPLE 49

Low gloss resin compositions were obtained in the same manner as in Example 47 except for blending an ABS resin (Kralastic 2938A, mfd. by Sumitomo Naugatuck Co., Ltd.) which was an acrylonitrile-butadiene-styrene copolymer, in place of the AAS resin, in each proportion shown in Table 27, and evaluation was carried out in the same manner as in Example 47.

TABLE 27

| Composition | Resin of Example 34 | 70 | 50 | 30 |
| --- | --- | --- | --- | --- |
|  | ABS resin | 30 | 50 | 70 |
| Characteristics | Surface gloss (%) | 18 | 25 | 27 |
|  | Izod impact strength (kg · cm/cm) | 43 | 40 | 37 |
|  | Falling weight impact strength (kg · cm) | 25 | 25 | 25 |
|  | HDT (°C.) | 91 | 92 | 93 |
|  | MFR (g/10 min) | 1.2 | 2.0 | 4.8 |

According to this invention, there can be obtained a low gloss agent which has a sufficiently low gloss and is well balanced between gloss and other properties such as Izod impact strength, Du Pont type falling weight impact strength, etc. Using this low gloss agent, there can be obtained a low gloss thermoplastic resin composition useful for obtaining molded articles which are required to have not only high heat resistance and impact resistance but also low gloss, for example, internal and external automotives trims, exterior parts of household electric appliances, etc., and these molded articles.

What is claimed is:

1. A low gloss agent comprising a grated copolymer containing a graft component derived from aromatic vinyl and vinyl cyanide in a weight ratio of 50/50 to 90/10 and a low-cis polybutadiene having a Mooney viscosity of 30 to 40 measured at 100° C. as a rubber component, 30% by volume or more of particles of the rubber component being non-spherical rubber particles when the low gloss agent is made into a molded article.

2. A low gloss agent according to claim 1, wherein the contents of rubber component and graft component in the grafted copolymer are 5 to 15% by weight and 95 to 85% by weight, respectively.

3. A low gloss agent according to claim 1, wherein the weight average molecular weight of an acetone soluble part of the agent is 100,000 to 600,000.

4. A molded article obtained by molding the low gloss agent of claim 1.

5. A molded article obtained by molding a low gloss thermoplastic resin composition comprising the low gloss agent of claim 1, and at least one other polymer.

6. A molded article according to claim 5, wherein rubber particles derived from the low gloss agent are dispersed in a matrix composed of the other polymer constituent and 30% or more of the rubber particles are non-spherical rubber particles.

7. A molded article according to claim 5, wherein the non-spherical rubber particles dispersed in the matrix are in the shape of fibers.

* * * * *